US012681240B2

(12) United States Patent  
Mosti et al.

(10) Patent No.: US 12,681,240 B2  
(45) Date of Patent: Jul. 14, 2026

(54) ADAPTOR FOR AN OPTICAL CONNECTOR

(71) Applicant: Telefonaktiebolaget LM Ericsson (publ), Stockholm (SE)

(72) Inventors: Sergio Mosti, Genoa (IT); Claudio D'Incà, Genoa (IT); Alberto Deho, Genoa (IT); Roberto Magri, Genoa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 303 days.

(21) Appl. No.: 18/289,743

(22) PCT Filed: May 12, 2021

(86) PCT No.: PCT/EP2021/062767

§ 371 (c)(1),  
(2) Date: Nov. 6, 2023

(87) PCT Pub. No.: WO2022/237984

PCT Pub. Date: Nov. 17, 2022

(65) Prior Publication Data

US 2024/0280760 A1      Aug. 22, 2024

(51) Int. Cl.  
*G02B 6/38* (2006.01)  
*G02B 6/40* (2006.01)

(52) U.S. Cl.  
CPC ........... *G02B 6/3825* (2013.01); *G02B 6/403* (2013.01)

(58) Field of Classification Search  
CPC .... G02B 6/3825; G02B 6/403; G02B 6/3831; G02B 6/387; G02B 6/3879; G02B 6/38  
See application file for complete search history.

(56) References Cited

U.S. PATENT DOCUMENTS

| | | | |
|---|---|---|---|
| 9,128,256 B2 * | 9/2015 | Miller | .................. G02B 6/3882 |
| 10,690,857 B2 * | 6/2020 | Chen | ........................ G02B 6/30 |
| 2020/0386951 A1 | 12/2020 | Lee et al. | |
| 2021/0215885 A1 | 7/2021 | Chen | |

FOREIGN PATENT DOCUMENTS

CN          212031790 U      11/2020

OTHER PUBLICATIONS

PCT International Search Report, mailed Jan. 19, 2022, in connection with International Application No. PCT/EP2021/062767, all pages.  
PCT Written Opinion, mailed Jan. 19, 2022, in connection with International Application No. PCT/EP2021/062767, all pages.

* cited by examiner

*Primary Examiner* — Jennifer Doan  
(74) *Attorney, Agent, or Firm* — Weisberg I.P. Law, P.A.

(57) ABSTRACT

An adaptor for an optical connector is provided. The optical connector defines first and second optical connector channels. The adaptor comprises a first part to couple to the optical connector and a second part comprising a connector portion for coupling to an optical device, in order to optically couple the first and second optical connector channels to the optical device. The first and second parts are movably coupled to one another and the first part is movable relative to the second part between first and second positions to selectively adjust a polarity of the connector portion.

18 Claims, 7 Drawing Sheets

900

Couple connector to adaptor — 902

Adjust position of adaptor parts — 904

1000

Couple connector to adaptor — 902

Adjust position of adaptor parts — 1010

Disengage locating features — 1012

Displace part of the adaptor — 1014

ADAPTOR FOR AN OPTICAL CONNECTOR

TECHNICAL FIELD

The present disclosure relates to an adaptor for an optical connector and is particularly, although not exclusively, concerned with an adaptor for enabling the polarity of a uniboot connector to be selectively adjusted.

BACKGROUND

Device racks, e.g. installed within telecommunications offices, may comprise a plurality of rack units which can each comprise large number of optical interfaces for optically connecting the rack units to other optical devices within the rack or the wider telecommunications office. Due to the large number of optical connections within the rack unit, it is often desirable to use optical cable assemblies comprising uniboot connectors to make the connections between the rack units.

FIG. 1 depicts one end of a previously proposed optical cable assembly 100, such as an optical patch cord. The optical cable assembly 100 comprises a cable 110 incorporating a pair of optical fibres, which is terminated by a uniboot connector 120 at ends of the cable 110. The connector 120 comprises a connector body 122 supporting first and second fibre optic ferrules 124a, 124b, which are optically connected to the respective optical fibres within the cable 110 in order to define first and second optical channels of the optical cable assembly. In this way, an optical cable assembly comprising a single cable terminating in a single connector can be used to provide two optical channels (i.e. formed by two waveguides and/or optical fibers), e.g. a send channel and a receive channel, between two optical interfaces.

Optical channels serving as connections between optical devices are typically established with a predetermined polarity, such that a particular optical channel is either for signals to be sent from a first optical device to a second optical device; or for signals from the second device to be received by the first optical. When a uniboot connector 120 defining a pair of optical channels is used to make the connection between the optical devices, one of the optical fibres forms a send channel, whilst the other of the optical fibres forms a receive channel.

As illustrated in FIG. 1, the fibre optic ferrules 124a, 124b of the connector 120 are supported side by side on the connector body 122, e.g. with one of the fibre optic ferrules on a first side 122a of the connector body and the other of the fibre optic ferrules on a second side 122b of the connector body. Accordingly, the fibre optic ferrule of the first side of the connector body may define a send channel and the fibre optic ferrule on the second side of the connector may define a receive channel, or vice versa. The connector body is asymmetrically shaped such that a connecting portion 123 of the connector body can only be received within a corresponding socket in a single orientation. Hence, if the polarity of the connector is incorrect, e.g. if the optical fibre forming the "send" channel is connected to the first fibre optic ferrule 124a arranged on a first side 122a of the connector body when is it desirable for the second fibre optic ferrule arranged on a second side 122b of the connector body to define the send channel, it is not possible to establish the desired optical connector using the optical cable assembly 100 and an alternative patch cord solution must be used.

Running an additional/alternative patch cord between optical devices when the polarity of a particular connector of an existing patch cord is found to be incorrect can lead to an undesirable increase in the cost of managing the telecommunications office.

SUMMARY

According to an aspect of the present disclosure, there is provided an adaptor for an optical connector. The optical connector defines first and second optical connector channels. The adaptor comprises a first part to couple to the optical connector and a second part comprising a connector portion for coupling to an optical device. The connector portion comprises a first and a second waveguides configured to optically couple the first and second optical connector channels to the optical device. The first and second parts are movably coupled to one another. The first part is movable relative to the second part between first and second configurations to selectively adjust a polarity of the first and a second waveguides of the connector portion relative to the first and second optical connector channel of the optical connector.

Within the present specification, the words channel, waveguide, fibre, and optical fibre ferrule may be used interchangeably.

The adaptor may comprise a locating configuration, in which the first part is restricted from moving between the first and second configurations; and an adjustment configuration, in which the first part is movable relative to the second part between the first and second configurations. In the locating configuration, the first part may be optically coupled to the second part. In the adjustment configuration, the first part may be optically decoupled from the second part.

The first part may be movable relative to the second part in a first direction between the locating configuration and the adjustment configuration. The first part may be movable relative to the second part in a second direction between the first and second configurations. The first part is biased towards the locating configuration.

The adaptor may comprise one or more locating features for locating the first part in the first and second positions relative to the second part. The locating features may comprise one or more protrusions, such as locating pins, protruding from one of the first and second parts and two or more recesses formed in the other of the first and second parts for receiving the one or more protrusions when the adaptor is in the first and second configurations, in order to prevent the first part moving relative to the second part between the first and second configurations.

The first part may be rotatable relative to the second part about a pivot axis between the first and second configurations. The adaptor may comprise a pivot pin defining the pivot axis. The first part may be rotatable about the pivot pin relative to the second part between the first and second configurations.

The first part may be linearly movable in a direction with a component parallel with the pivot axis between the locating configuration and the adjustment configuration. The first part and/or the second part may be linearly movable along the pivot pin between the locating configuration and the adjustment configuration.

The second part may comprise first and second fibre optic ferrules respectively defining first and second optical channels of the adaptor. The first part may comprise first and second intermediate fibre optic ferrules for optically coupling to the first and second optical connector channels respectively. The first and second fibre optic ferrules of the second part may be optically couplable to respective ones of the first and second intermediate fibre optic ferrules of the first part.

When the adaptor is in the first configuration, the first fibre optic ferrule may be optically coupled to the first optical connector channel and the second fibre optic ferrule may be optically coupled to the second optical connector channel. When the adaptor is in the second configuration, the first fibre optic ferrule may be optically coupled to the second optical connector channel and the second fibre optic ferrule may be optically coupled to the first optical connector channel.

The first part may be configured to couple to the optical connector, such that portions of the optical fibres carried by the optical connector, e.g. within fibre optic ferrules of the optical connector, extend beyond the first part to be received within the second part.

The protrusions may protrude from the first part towards the second part or from the second part towards the first part by a greater distance, than the portions of the optical fibres, e.g. within fibre optic ferrules of the optical connector, protrude from the first part towards the second part.

The second part may comprise first and second openings for receiving the portions of the optical fibres, e.g. within fibre optic ferrules of the optical connector. The second part may further comprise first and second sleeves disposed about the first and second openings and extending towards the first part.

A shape of the connector portion may correspond to a shape of the optical connector, e.g. the optical connector to be coupled to the first part of the adaptor.

According to another aspect of the present disclosure, there is provided a method of adjusting the polarity of an optical connector. The optical connector defines first and second optical channels. The method comprises coupling the optical connector to an adaptor. The adaptor comprises a first part to couple to the optical connector and a second part comprising a connector portion for coupling to an optical device. The connector portion comprises a first and a second waveguides configured to optically couple the first and second optical connector channels to the optical device. The first and second parts are movably coupled to one another, and the first part is movable relative to the second part between first and second configurations to selectively adjust a polarity of the first and a second fibre optic ferrule waveguides of the connector portion relative to the first and second optical connector channel of the optical connector. The method further comprises adjusting the position of the first part of the adaptor relative to the second part to thereby adjust the polarity of the connector portion.

Adjusting the configuration of the adaptor may comprise displacing the first part relative to the second part in order to disengage one or more locating features locating the position of the first part relative to the second part. Additionally or alternatively, adjusting the configuration of the adaptor may comprise displacing the first part between the first and second positions.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1:
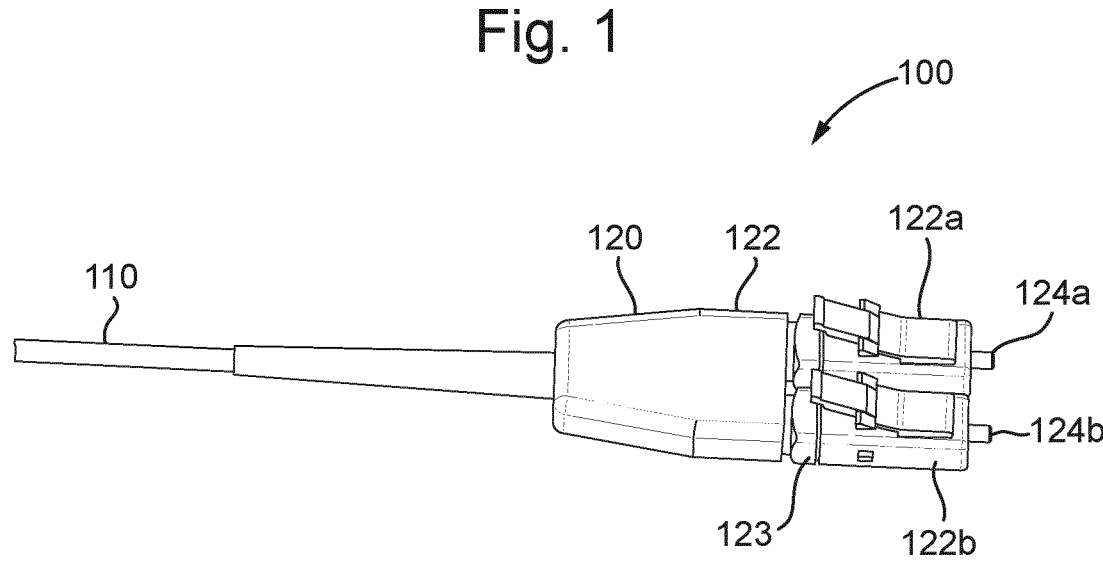
FIG. 1 is a perspective view of a previously proposed optical cable connector.
Figure 2:
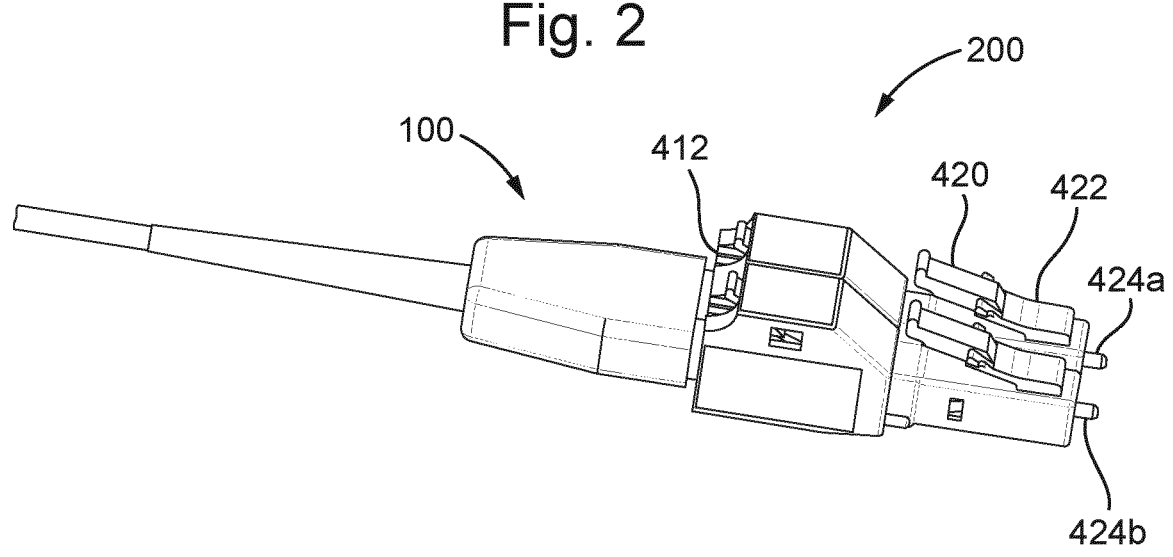
FIG. 2 is a perspective view of an adaptor assembly according to the present disclosure.
Figure 3:
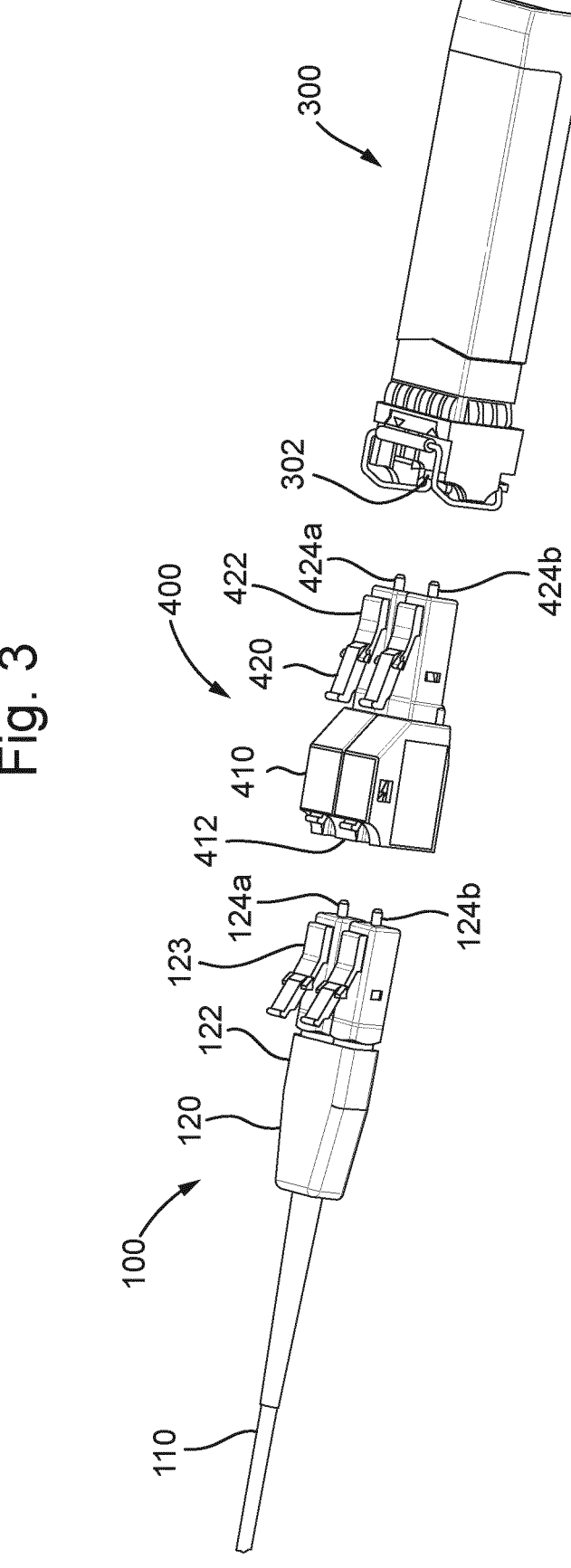
FIG. 3 is an exploded view of the adaptor assembly shown in FIG. 2.

With reference to FIGS. 2 and 3, in order to enable a polarity of an optical connection, e.g. established using an optical cable assembly comprising a uniboot connector, to be selectively adjusted, e.g. reversed, an adaptor assembly 200 according to arrangements of the present disclosure may be provided.

In an example, the adaptor assembly 200 comprises an optical cable assembly, such as the optical cable assembly 100, and an adaptor 400. As described above, the cable assembly compresses a connector 120 having first and second waveguides, such as fibre optic ferrules 124a, 124b or optical fibres, respectively supported on first and second sides 122a, 122b of the connector 122. The waveguides, e.g. fibre optic ferrules 124a, 124b, are optically connected to respective optical fibres passing through the optical fibre cable 110 of the cable assembly 100, which define first and second channels of the optical cable assembly, e.g. configured as send and receive channels respectively. The connector 120 therefore has a particular polarity determined by which fibre optic ferrule 124a, 124b is coupled to the optical fibre defining the first channel and which fibre optic ferrule is coupled to the optical fibre defining the second channel.

The terms "channel", "waveguide", "ferrule" or "optical fibre", may be used interchangeably to mean components which able to carry transmitted optical signals.

The connector 120 may be a standard optical connector, such as a Lucent Connector (LC) connector, LC/LC uniboot connector or any other standard connector, e.g. LC/LC connector. Accordingly, the connecting portion 123 of the connector may be configured, e.g. shaped, to be received within standard sockets, e.g. standard LC sockets. The connecting portion 123 of the connector body can only be received within a corresponding socket in a single orientation. Thus, in this example, the connecting portion 123 defines the polarity, i.e. orientation, of the connector 120. The polarity is fixed related to the polarity, i.e. orientation, of the connector 120 at the other end of the optical fibres.

The adaptor 400, comprises a first part 410 and a second part 420. The first part 410 comprise one or more apertures 412 configured to receive the connecting portion 123 of the connector 120. In the arrangement shown, the first part 410 of the adaptor comprises two apertures. When the connector is a standard connector, such as an LC/LC connector, a shape of the apertures 412 may correspond to the shape of standard LC sockets.

The second part 420 comprises a connecting portion 422 for coupling to an optical device, such as the optical transceiver 300. The connecting portion 422 may have a shape corresponding to the shape of the connecting portion 123 of the connector 120. For example, when the connector 120 is a standard connector, such as an LC/LC uniboot connector, the shape of the connecting portion 422 of the adaptor may correspond to the shape of the connecting portion of the standard connector. The connecting portion 422 of the adaptor is thereby configured to be received within a socket 302, e.g. of an optical transceiver 300, that is configured to receive the connecting portion 123 of the connector 120.

The adaptor 400 further comprises first and second waveguides, such as first and second fibre optic ferrules 424a, 424b or portions of optical fibre, supported on the connecting portion 422 of the adaptor. The first and second fibre optic ferrules 424a, 424b may be supported on the connecting portion 422 of the adaptor in the same way that the first and second fibre optic ferrules 124a, 124b are supported on the connecting portion 123 of the connector 120.

Figure 4A:
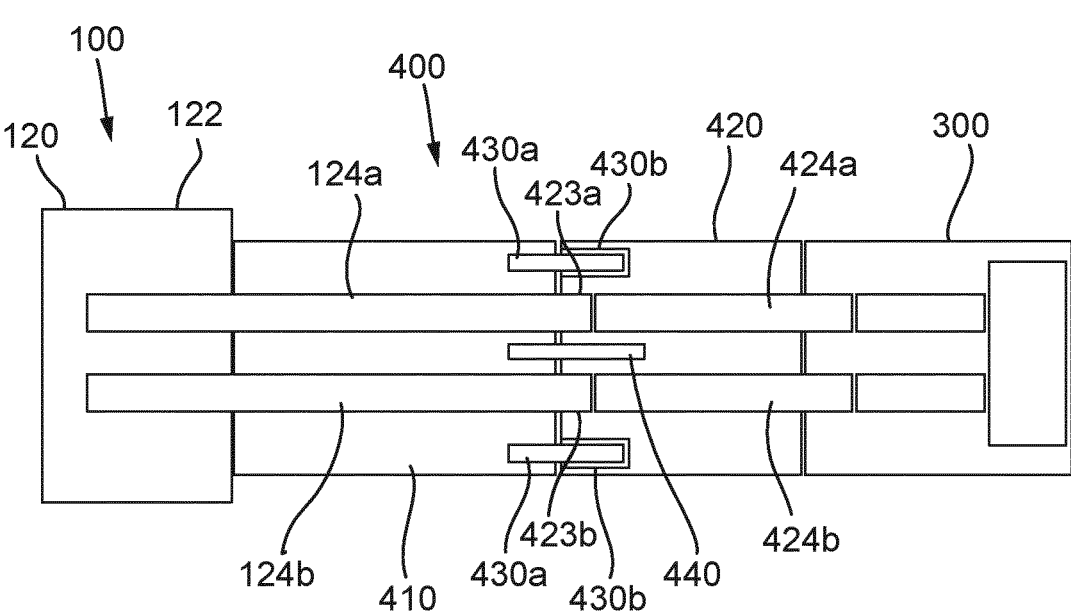
FIG. 4a is a schematic sectional view of the adaptor assembly shown in FIGS. 2 and 3 in a first configuration.
Figure 4B:
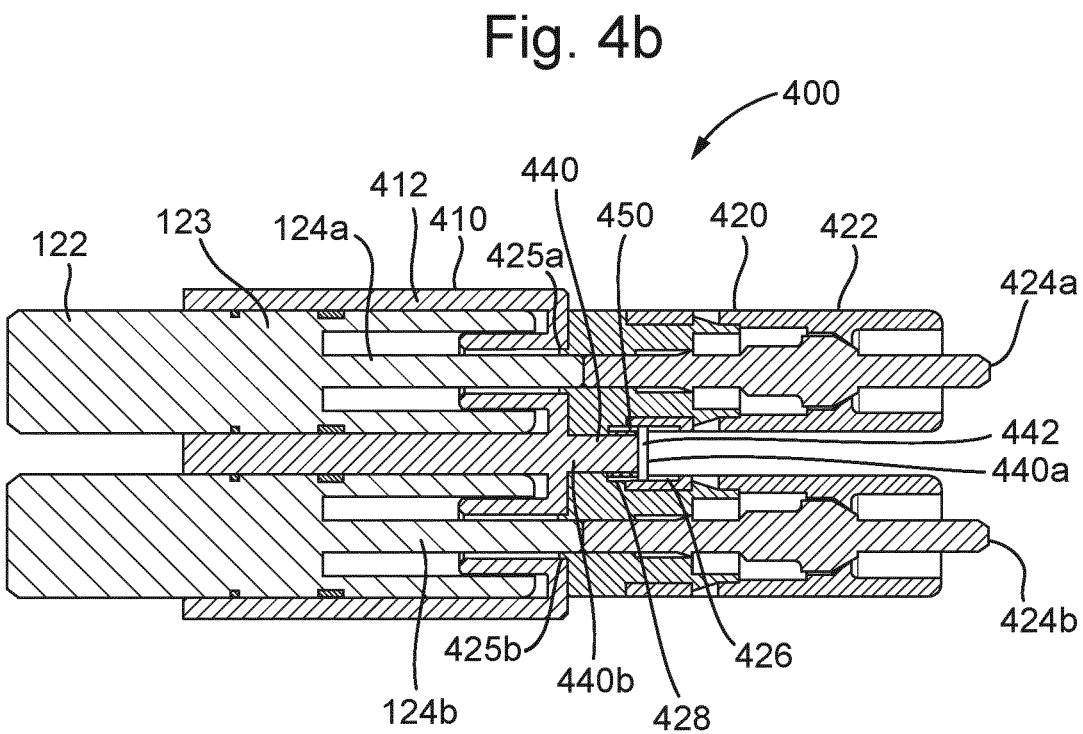
FIG. 4b is a sectional view of the adaptor assembly shown in FIGS. 2 and 3 in the first configuration.

As illustrated in FIGS. 4a and 4b, when the connector 120 is coupled to the adaptor 400, e.g. when the connecting portion 123 is received within the one or more apertures 412, the fibre optic ferrules 124a, 124b of the connecting portion 123 may be optically coupled to the fibre optic ferrules 424a, 424b of the adaptor 400. In this way, an optical connection can be established from the optical cable assembly 100 to a socket, e.g. the socket 302 of an optical transceiver 300, via the adaptor 400. In other words, the adaptor 400 is configured to enable the first and second optical channels defined by the optical cable assembly 100 to be optical coupled to an optical device when the connecting portion 422 of the adaptor is coupled to the optical device. In this example, the fibre optic ferrules 124a, 124b are directly optically connected to the fibre optic ferrules 424a, 424b of the adaptor 400. The fibre optic ferrules 424a, 424b of the adaptor 400 are configured to directly optically connect to a socket 302 of an optical transceiver 300 (e.g. as part of optical telecommunications equipment).

As depicted in FIGS. 4a and 4b, portions of the optical fibres carried by the optical connector, e.g. within fibre optic ferrules 124a, 124b of the optical connector, may extend beyond the first part 410 to be received within the second part 420. The second part 420 may comprise first and second openings 423a, 423b for receiving the fibre optical ferrules 124a, 124b extending from the first part 410 towards the second part 420. The second part 420 may further comprises first and second sleeves 425a, 425b disposed about the first and second openings. The sleeves may extend towards the first part 410 and may be received within openings 412a, 412b in the first part from which the optical ferrules 124a, 124b protrude.

The adaptor 400 is configured to enable the polarity of the connecting portion 422 to be selectively adjusted, e.g. reversed, relative to the connector 120 of the optical cable assembly. In particular, the adaptor 400 is configured to enable which of the waveguides, e.g. fibre optic ferrules 424a, 424b, of the adaptor is connected to which of the fibre optic ferrules 124a, 124b of the connector to be selectively adjusted.

Figure 5A:
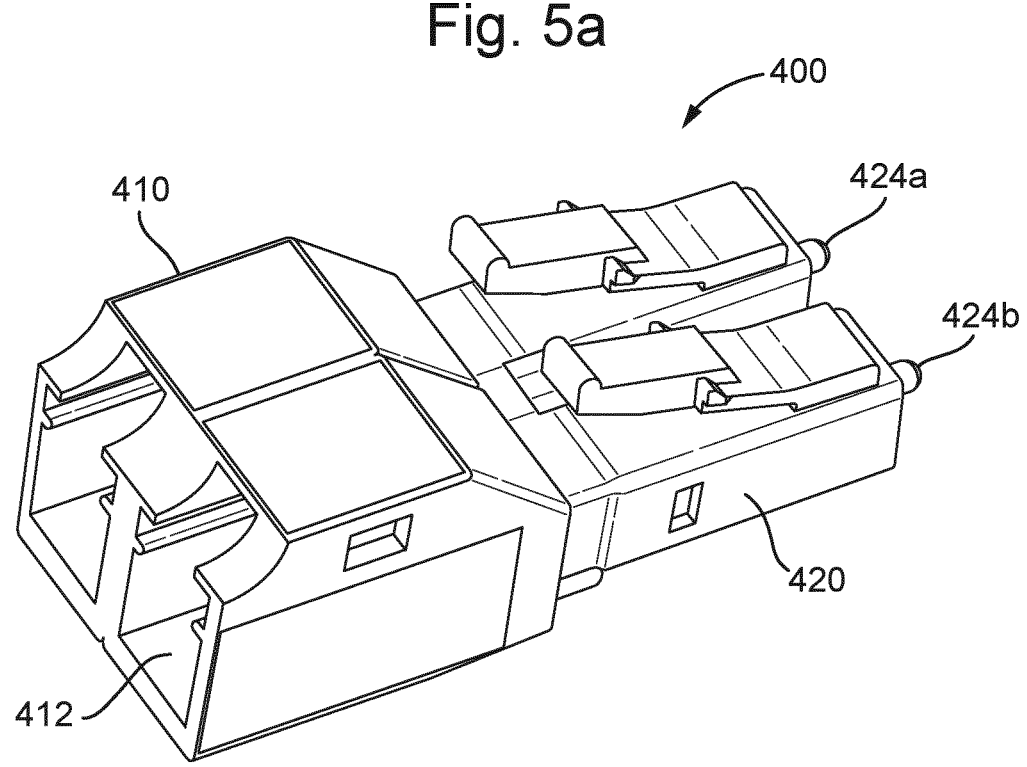
FIGS. 5a and 5b are perspective views of the adaptor shown in FIGS. 2 and 3 in first and second configurations respectively.
Figure 5B:
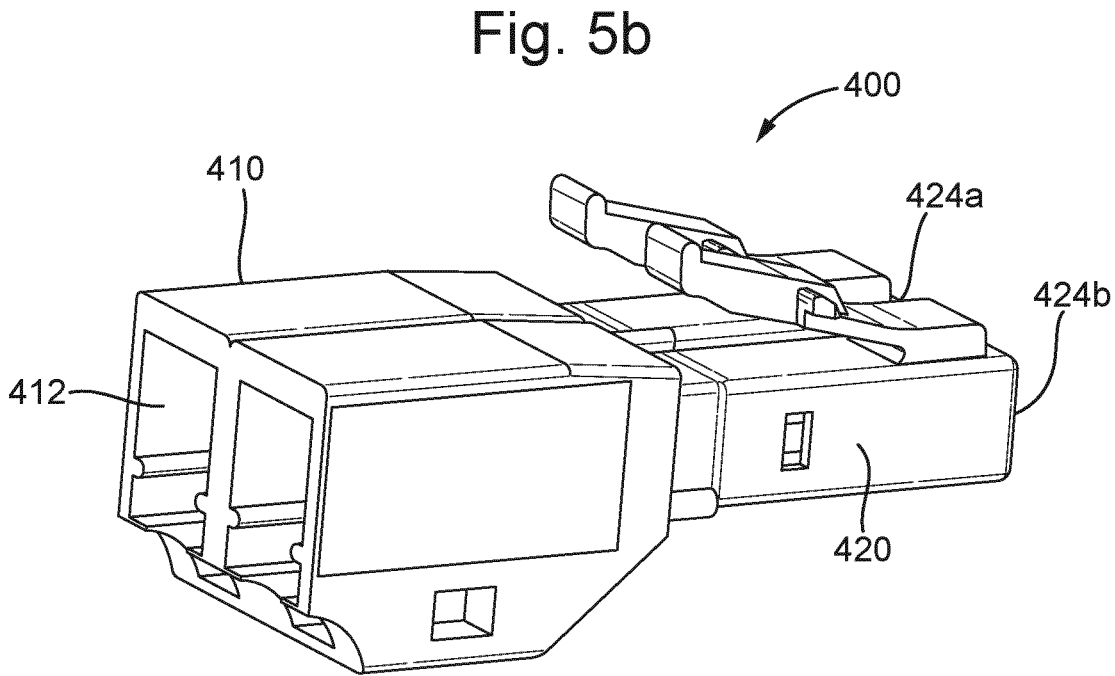

With reference to FIGS. 5a and 5b, the first and second parts 410, 420 of the adaptor are movably coupled to one another. In particular, the first and second parts are selectively movable, e.g. pivotable or rotatable, between a first configuration, depicted in FIG. 5a and a second configuration depicted in FIG. 5b, in order to selectively adjust a polarity of the connecting portion of the adaptor.

As illustrated, in the second configuration, an orientation of the first part 410 of the adaptor relative to the second part 420 differs by 180 degrees compared to the orientation of the first part 410 relative to the second part 420 in the first configuration. Accordingly, the orientation of a connector 120 of an optical cable assembly that is coupled to the adaptor 400, e.g. to the first part 410 of the adaptor will differ by 180 degrees relative to the second part 420 of the adaptor when the adaptor is in the second configuration compared to when the adaptor is in the first configuration.

As detailed above, the fibre optic ferrules 424a, 424b of the adaptor are supported on the second part 410 of the adaptor, and hence, by adjusting the orientation of the optical connector 120 of the cable assembly relative to the second part 420 of the adaptor, the connections between the fibre optic ferrules 124a, 124b of the connector 120 and the fibre optic ferrules 424a, 242b of the adaptor can be adjusted, e.g. interchanged, such that the polarity of the connecting portion 422 of the adaptor is adjusted, e.g. reversed. In other words, adjusting the configuration of the adaptor 400 from the first configuration to the second configuration enables the adaptor 400 to adjust, e.g. swap, which of the fibre optic ferrules 424a, 424b of the adaptor is connected to which of the fibre optic ferrules 124a, 124b of the connector 120, thereby adjusting, e.g. reversing, the polarity of the connecting portion of the adaptor.

Returning to FIG. 4a, the adaptor 400 may further comprise locating features 430a, 430b configured to locate the position of the first part 410 of the adaptor relative to the second part 420. In other words, the locating features 430a, 430b may be configured to restrict movement of the first part 410 of the adaptor relative to the second part 420 between the first and second configurations.

The locating features may comprise one or more protrusions, such as the locating pins 430a, which protrude from one of the first and second parts 410, 420. The locating features, e.g. locating pins 430a, may be coupled to the one of the first and second parts 410, 420. The locating features may further comprise two or more recesses 430b formed in the other of the first and second parts for receiving the protrusions when the first part is in the first and second position relative to the second part, e.g. when the adaptor is in the first and second configurations. As shown, the protrusions 430a may protrude from the first part 410 by a greater distance than the fibre optical ferrules 124a, 124b for optically connecting to the second part 420.

In other arrangements, the locating features may comprise protrusions, e.g. locating pins, which protrude from both of the first and second parts to be received within corresponding recesses formed in the second and first parts respectively.

FIGS. 4a, 4b, 5a and 5b depict the adaptor 400 in locating configurations, in which the locating features 430a, 430b are restricting movement of the first part 410 relative to the second part 420 between the first and second configurations. In particular, the one or more protrusions 430a protruding from one of the first and second parts are received within ones of the recesses 430b formed in the other of the first and second parts 410, 420.

When the adaptor 400 is in the locating configurations, the first and second parts of the adaptor may be optically coupled, such that optical connections are formed between the first and second parts, e.g. between the first and second fibre optic ferrules of the connector and the first and second ferrules of the adaptor. As described above, which of the fibre optic ferrules 124a, 124b of the connector that is optically connected to which of the fibre optic ferrules 424a, 424b of the adaptor depends on whether the adaptor is in the first or second configuration.

Figures 6, 7:
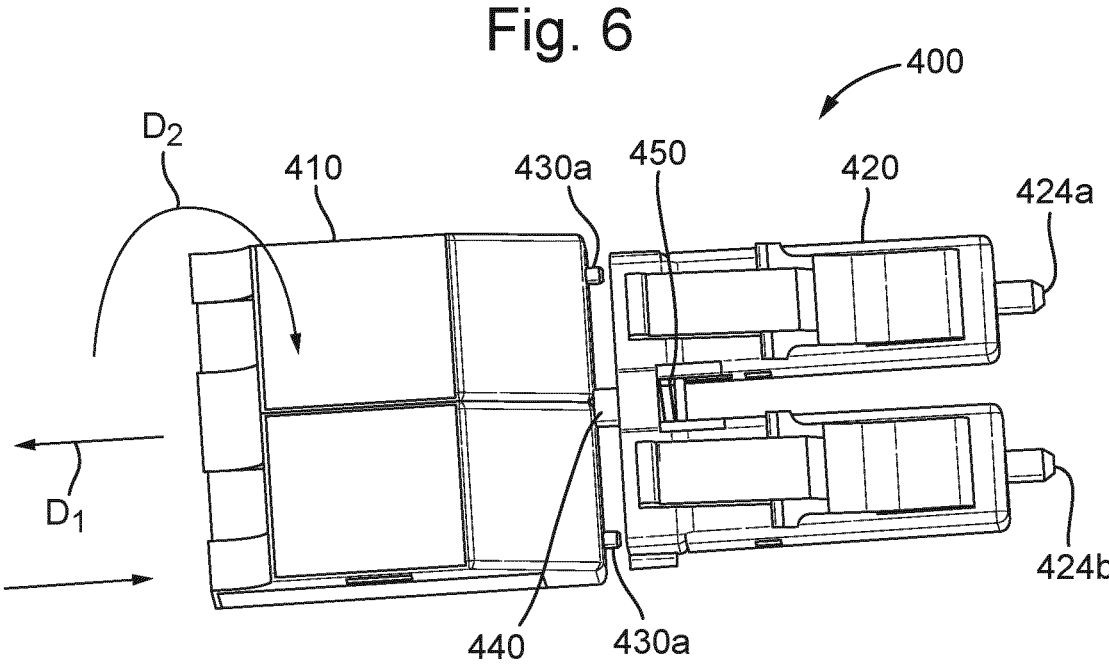
FIG. 6 is a perspective top view of the adaptor shown in FIGS. 2 and 3 in an adjustment configuration.
FIG. 7 is an exploded side view of the adaptor assembly shown in FIGS. 2 and 3.

With reference to FIG. 6, the adaptor 400 may be arranged in an adjustment configuration, in which the location features 430a, 430b do not restrict movement of the first part 410 relative to the second part 420 between the first and second configurations. For example in the adjustment configuration, the protrusions 430a protruding from one of the first and second parts 410, 420 of the adaptor may not be received within the recesses 430b formed in the other of the first and second parts.

As indicated in FIG. 6, the first part 410 of the adaptor may be movable, e.g. linearly movable or slideable, relative to the second part 420 in a first direction D1. Moving the first part 410 in which way may adjust the configuration of the adaptor 400 between the locating configurations and the adjustment configuration. As further indicated, the first part 410 may be movable, e.g. pivotally/rotatably movable, relative to the second part 420 in a second direction D2 (clockwise or counter-clockwise) between the first configuration and the second configuration.

As shown in FIG. 6, the adaptor 400 may further comprise a pivot pin 440. The pivot pin 440 may be coupled, e.g. fixedly coupled, to one of the first and second parts 410, 420 of the adaptor and may be pivotally, and optionally slideably, coupled to the other of the first and second parts. The first part 410 of the adaptor may be rotatable about the pivot pin, e.g. about a pivot axis defined by the pivot pin, relative to the second part 420 between the first and second configurations depicted in FIGS. 5a and 5b respectively.

In some arrangements, the first part 410 of the adaptor may be linearly moveable, e.g. slideable, along the pivot pin 440 relative to the second part 420 between the locating configurations and the adjustment configuration. The first part 410 may be coupled to the second part 420 by the pivot pin 440 to enable rotational and linear movement, e.g. pivoting and sliding, of the first part 410 relative to the second part 420.

The first and/or second parts 410, 420 of the adaptor may be biased into the locating configurations. For example, the first part 410 of the adaptor may be biased to move relative to the second part 420 from the adjustment configuration to one of the locating configurations. As depicted in FIGS. 4b and 6, the adaptor 400 may comprise a biasing member 450, such as a coil spring, arranged to bias the first part 410 to move relative to the second part 420 from the adjustment configuration to the locating configuration.

In some examples, the first and second parts 410, 420 of the adaptor are permanently connected together. The first and second parts 410, 420 are still connected during movement of the first and second parts 410, 420 from a the locating configuration into the adjustment configuration (e.g. by linearly moving apart along an axis of the connector). The first and second parts 410, 420 are still connected whilst the first and second parts 410, 420 are rotated in the adjustment configuration, and also when moved into the alternative orientation of the other locating configuration. Alternatively, the first and second parts 410, 420 are separable and may be freely orientated whilst separated. The first and second parts 410, 420 may be re-attached in a different orientation to achieve the alternative orientation of the other locating configuration.

As shown in FIG. 7, the pivot pin 440 may comprise a flange 442 formed at a first end 440a of the pivot pin. The flange 442 may be a portion, e.g. length, of the pivot pin having a greater diameter than a remaining portion, e.g. a remaining length, of the pivot pin. The biasing member 450 of the adaptor may be arranged to act against the flange 442 in order to bias the first part 410 of the adaptor into the locating configurations.

As depicted in FIG. 4b, the pivot pin 440 may be coupled, e.g. fixedly coupled to the first part 410 at a second end 440b of the pivot pin and the first end 440a, at which the flange 442 is formed, may be received within a bore or channel 426 at least partially defined by the second part 420. The second part 420 may further comprise a shoulder 428, e.g. formed by a portion of the channel 426 having a reduced diameter/ area. The biasing member 450 may be arranged between the flange 442 and the shoulder 428. As illustrated, the biasing member 450 may be disposed about the pivot pin 440 within the bore 426. In other arrangements, the pivot pin 440 may be fixedly coupled to the second part and the bore may be formed in the first part.

Figure 8A:
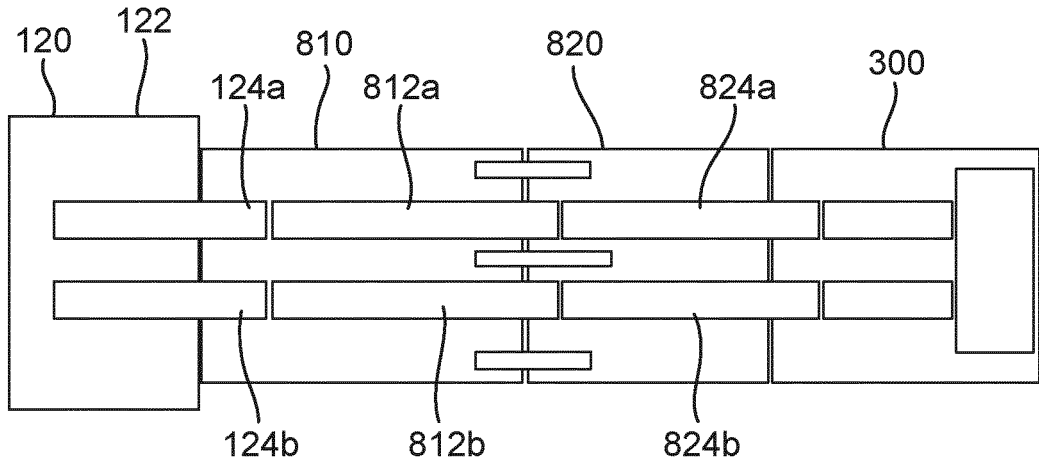
FIG. 8a is a schematic cross-sectional view another adaptor assembly according to arrangements of the present disclosure in a first configuration.
Figure 8B:
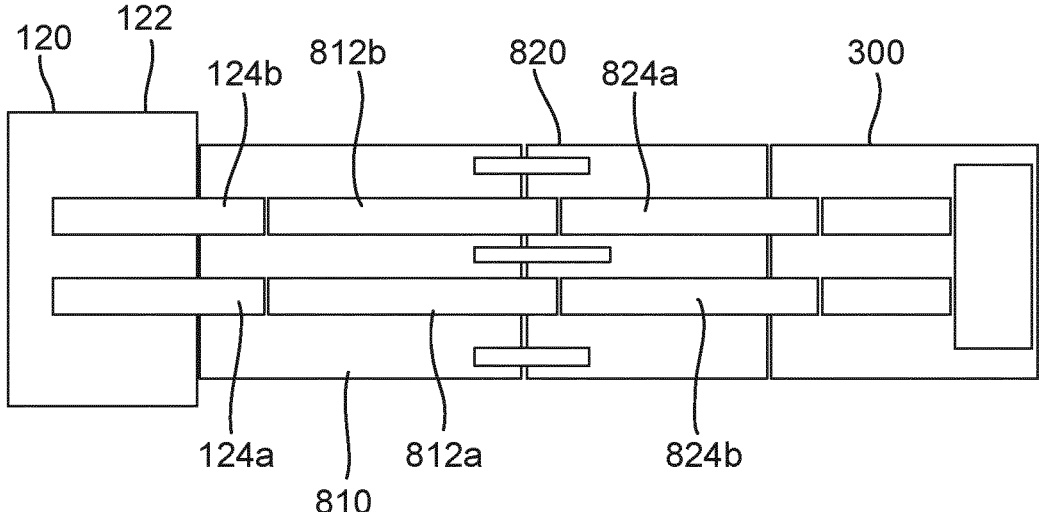
FIG. 8b is a schematic cross-sectional view of the adaptor assembly shown in FIG. 8a in a second configuration.

With reference to FIGS. 8a and 8b, an adaptor 800 according to another arrangement of the present disclose will now be described. The adaptor 800 is similar to the adaptor 400 described above and comprises a first part 810 and a second part 820, which may be similar to the first and second parts 410, 420 described above. Features of the adaptor 400 detailed above may apply equally to the adaptor 800.

The adaptor 800 differs from the adaptor 400 in that the adaptor 800 further comprises first and second intermediate waveguides, such as first and second intermediate fibre optic ferrules 812a, 812b, provided in the first part 810 of the adaptor. As shown, when the optical connector 120 is coupled to the first part 810 of the adaptor, the first and second fibre optic ferrules 124a, 144b of the connector are optically coupled to the first and second intermediate fibre optic ferrules 812a, 812b respectively.

The first and second intermediate fibre optic ferrules 812a, 812b are provided in the adaptor 800 in addition to first and second fibre optic ferrules 824a, 824b provided in the second part 820 of the adaptor. The first and second fibre optic ferrules 824a, 824b may be similar to the first and second fibre optic ferrules 424a, 424b of the adaptor 400. In particular, when the second part 820 of the adaptor is coupled to an optical device, such as the optical transceiver 300, the first and second fibre optic ferrules 824a, 824b may be optically connected to the optical device 300. As shown, when the adaptor 800 is in the locating configurations, the first and second intermediate fibre optic ferrules 812a, 812b are optically connected to the first and second fibre optic ferrules 824a, 824b of the adaptor.

The first and second parts 810, 820 of the optical adaptor are adjustable between first and second configurations in the same way as the first and second parts 410, 420 of the adaptor 400 described above. When the optical adaptor is in the first configuration, as shown in FIG. 8a, the first intermediate fibre optic ferrule 812a is optically connected to the first fibre optic ferrule 824a of the adaptor and the second intermediate fibre optic ferrule 812b is optically connected to the second fibre optic ferrule 824b of the adaptor. As shown in FIG. 8*b*, when the optical adaptor 800 is in the second configuration, the first intermediate fibre optic ferrule 812*a* is optically connected to the second fibre optic ferrule 824*b* of the adaptor and the second intermediate fibre optic ferrule 812*b* is optically connected to the first fibre optic ferrule 824*a* of the adaptor. In this way the polarity of a connector portion 822 of the adaptor 800 can be adjusted, e.g. reversed, relative to the polarity of the connector 120.

Figure 9:
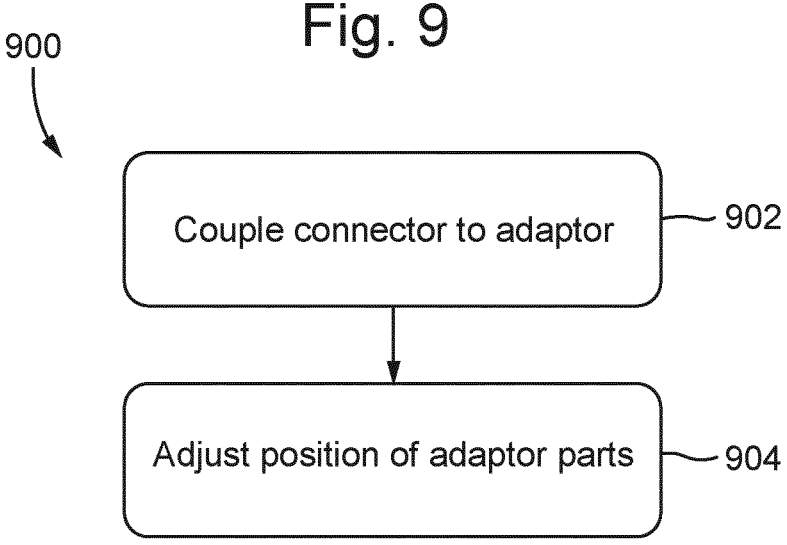
FIG. 9 is a flow chart illustrating a method of adjusting the polarity of an optical connector according to arrangements of the present disclosure.

With reference to FIG. 9, a method 900 of adjusting the polarity of an optical connector, such as the optical connector 120, according to arrangements of the present disclosure will now be described. The method comprises a first step 902, in which the optical connector 120 is coupled to an adaptor, such as the adaptor 400, 800 described above.

The method 900 further comprises a second step 904, in which the position of the first part 410, 810 of the adaptor is adjusted relative to the second part 820 to thereby adjust the polarity of the connector portion. In particular, the position of the first part 410, 810 of the adaptor may be adjusted relative to the second part 420, 820 to adjust the configuration of the adaptor between the first configuration and the second configuration.

Figure 10:
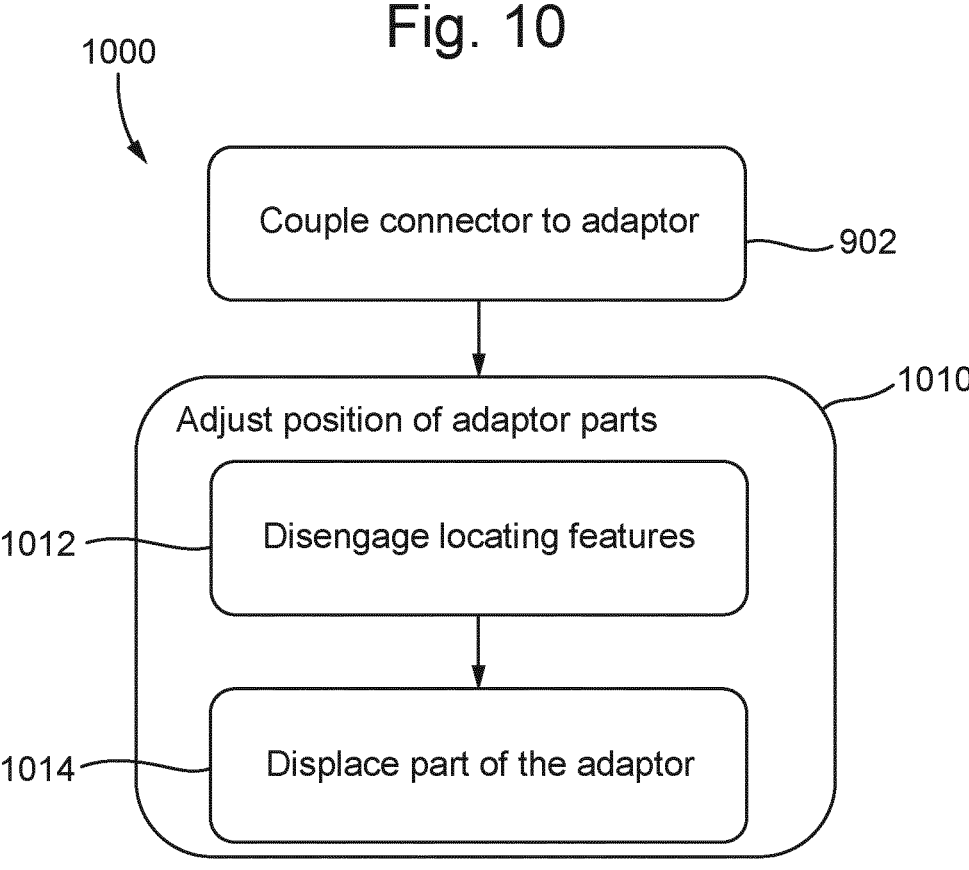
FIG. 10 is a flow chart illustrating another method of adjusting the polarity of an optical connector according to arrangements of the present disclosure.

With reference to FIG. 10, another method 1000 of adjusting the polarity of an optical connector will now be described. The method 1000 may comprise the method 900. In particular, the method 1000 may comprise the first step 902.

The method 1000 further comprises a polarity adjustment step 1010. The polarity adjustment step may be similar to the second step 904. The polarity adjustment step 1010 may comprise a third step 1012, at which locating features, such as the locating features 430*a*, 430*b* described above, e.g. for locating the position of the first part of the connector relative to the second part of the connector, may be disengaged.

The polarity adjustment step 1010 may further comprise a fourth step 1014, at which part of the adaptor, such as the first part 410, 810, is displaced relative to another part of the adaptor, such as the second part 420, 820, in order to adjust the configuration of the adaptor, e.g. between the first and second configurations. For example, the first part 410, 810 may be pivoted relative to the second part 420, 820 about the pivot pin 440 of the adaptor. The first part 410, 810 and second part are then returned to the other of the first and second configurations. As such, the orientation or polarity of the connector having two or more channels is reversed.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

It will be appreciated by those skilled in the art that although the invention has been described by way of example, with reference to one or more exemplary examples, it is not limited to the disclosed examples and that alternative examples could be constructed without departing from the scope defined by the appended claims.

The invention claimed is:

1. An adaptor for an optical connector, the optical connector defining first and second optical connector channels, wherein the adaptor comprises a first part to couple to the optical connector and a second part comprising a connector portion for coupling to an optical device, wherein the connector portion comprises a first and a second waveguides configured to optically couple the first and second optical connector channels to the optical device, wherein the first and second parts are movably coupled to one another, and wherein the first part is movable relative to the second part between first and second configurations to selectively adjust a polarity of the first and a second waveguides of the connector portion relative to the first and second optical connector channel of the optical connector.

2. The adaptor of claim 1, wherein the adaptor comprises a locating configuration, in which the first part is restricted from moving between the first and second configurations; and an adjustment configuration, in which the first part is movable relative to the second part between the first and second configurations.

3. The adaptor of claim 2, wherein in the locating configuration, the first part is optically coupled to the second part; and in the adjustment configuration, the first part is optically decoupled from the second part.

4. The adaptor of claim 2- or 3, wherein the first part is movable relative to the second part in a first direction between the locating configuration and the adjustment configuration; and wherein the first part is movable relative to the second part in a second direction between the first and second configurations.

5. The adaptor of claim 4, wherein the first part is biased towards the locating configuration.

6. The adaptor of claim 1, wherein the adaptor comprises one or more locating features for locating the first part in the first and second positions relative to the second part.

7. The adaptor of claim 6, wherein the locating features comprise one or more protrusions protruding from one of the first and second parts and two or more recesses formed in the other of the first and second parts for receiving the one or more protrusions when the adaptor is in the first and second configurations, in order to prevent the first part moving relative to the second part between the first and second configurations.

8. The adaptor of claim 1, wherein the first part is rotatable relative to the second part about a pivot axis between the first and second configurations.

9. The adaptor of claim 8, wherein the adaptor comprises a pivot pin defining the pivot axis, wherein the first part is rotatable about the pivot pin relative to the second part between the first and second configurations.

10. The adaptor of claim 2,
   wherein the first part is rotatable relative to the second part about a pivot axis between the first and second configurations; and
   wherein the first part is linearly movable in a direction with a component parallel with the pivot axis between the locating configuration and the adjustment configuration.

11. The adaptor of claim 9, wherein the first part and/or the second part is linearly movable along the pivot pin between the locating configuration and the adjustment configuration.

12. The adaptor of claim 1, wherein the second part comprises first and second fibre optic ferrules respectively defining first and second optical channels of the adaptor.

13. The adaptor of claim 1, wherein the first part comprises first and second intermediate fibre optic ferrules for optically coupling to the first and second optical connector channels respectively.

14. The adaptor of claim 12, wherein when the adaptor is in the first configuration, the first fibre optic ferrule is optically coupled to the first optical connector channel and the second fibre optic ferrule is optically coupled to the second optical connector channel, and when the adaptor is in the second configuration, the first fibre optic ferrule is optically coupled to the second optical connector channel and the second fibre optic ferrule is optically coupled to the first optical connector channel.

15. The adaptor of claim 1, wherein the first part is configured to couple to the optical connector, such that portions of the optical fibres carried by the optical connector extend beyond the first part to be received within the second part.

16. The adaptor of claim 1, wherein a shape of the connector portion corresponds to a shape of the optical connector.

17. A method of adjusting the polarity of an optical connector, the optical connector defining first and second optical channels, wherein the method comprises:

coupling the optical connector to an adaptor, wherein the adaptor comprises a first part to couple to the optical connector and a second part comprising a connector portion for coupling to an optical device, wherein the connector portion comprises a first and a second waveguides configured to optically couple the first and second optical connector channels to the optical device, wherein the first and second parts are movably coupled to one another, and wherein the first part is movable relative to the second part between first and second configurations to selectively adjust a polarity of the first and a second fibre optic ferrule waveguides of the connector portion relative to the first and second optical connector channel of the optical connector; and adjusting the position of the first part of the adaptor relative to the second part to thereby adjust the polarity of the connector portion.

18. The method of claim 17, wherein the adjusting the configuration of the adaptor comprises: displacing the first part relative to the second part in order to disengage one or more locating features locating the position of the first part relative to the second part; and displacing the first part between the first and second positions.

\* \* \* \* \*